United States Patent Office 3,767,701
Patented Oct. 23, 1973

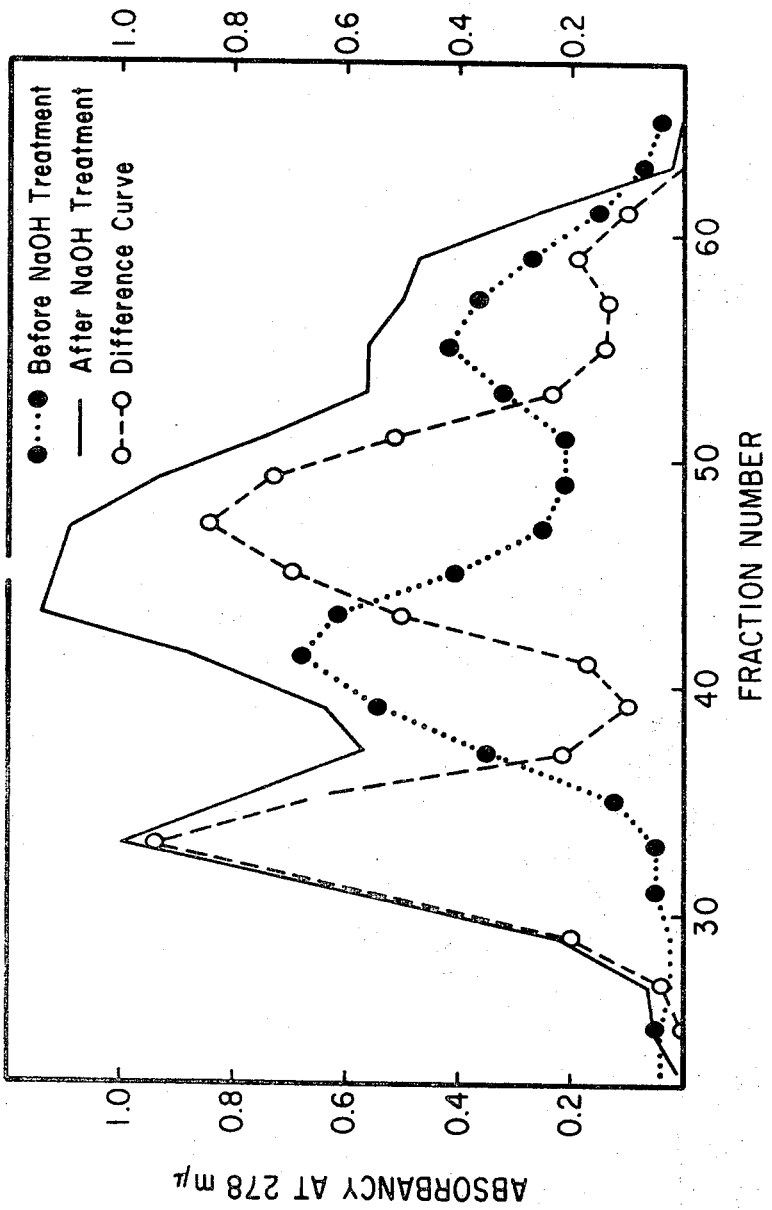

3,767,701
19-HYDROXY PROSTAGLANDIN $B_1$
Bengt Samuelsson, Kemiska Institutionen,
Karolinska Institutet, Stockholm, Sweden
Continuation-in-part of application Ser. No. 17,831, Mar.
9, 1970, which is a continuation-in-part of application
Ser. No. 481,777, Aug. 23, 1965, both now abandoned.
This application June 20, 1972, Ser. No. 264,474
Claims priority, application Great Britain, July 30, 1965,
32,780/65
Int. Cl. C07c 61/36
U.S. Cl. 260—514 D     3 Claims

ABSTRACT OF THE DISCLOSURE

A group of prostaglandins, 19-hydroxy-$PGA_1$, 19-hydroxy $PGA_2$, 19-hydroxy-$PGB_1$, and 19-hydroxy-$PGB_2$, and their salts, esters, and acylates, are disclosed. These are useful for a variety of pharmacological uses, including blood pressure lowering, treatment of asthma and ulcers, relief of nasal congestion, and wound healing.

CROSS REFERENCE TO RELATED APPLICATIONS

This application is a continuation-in-part of my copending application Ser. No. 17,831, filed Mar. 9, 1970, now abandoned, which is a continuation-in-part of my copending application Ser. No. 481,777, filed Aug. 23, 1965, and now abandoned.

DESCRIPTION OF THE INVENTION

This invention relates to novel compositions of matter, and to methods for obtaining, producing, and using them. In particular, this invention relates to certain derivatives of prostanoic acid which has the following structural formula and numbering:

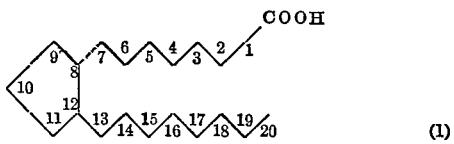

(I)

The two chains in Formula I are attached to the cyclopentane ring at C–8 and C–12 are in trans configuration. See Bergstrom et al., J. Biol. Chem. 238, 3555–3564 (1963) and Horton, Experientia 21, 113 (1965).

The compounds of this invention include essentially pure compounds of the formulas:

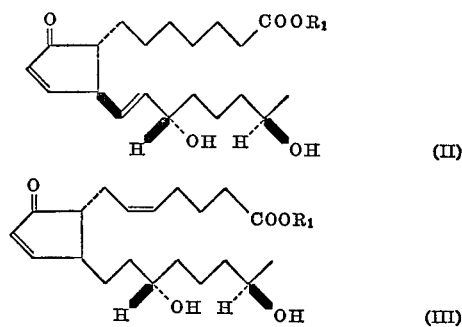

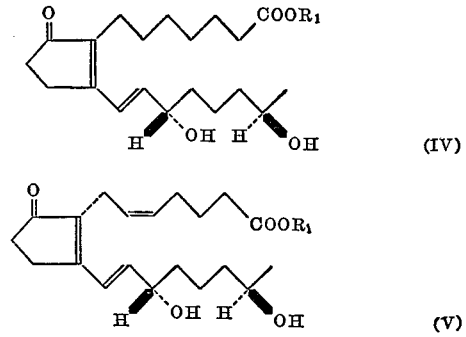

In Formulas II, III, IV, and V, $R_1$ is hydrogen or a pharmacologically acceptable cation.

The compounds of this invention also include alkyl esters and alkanoates of the formulas:

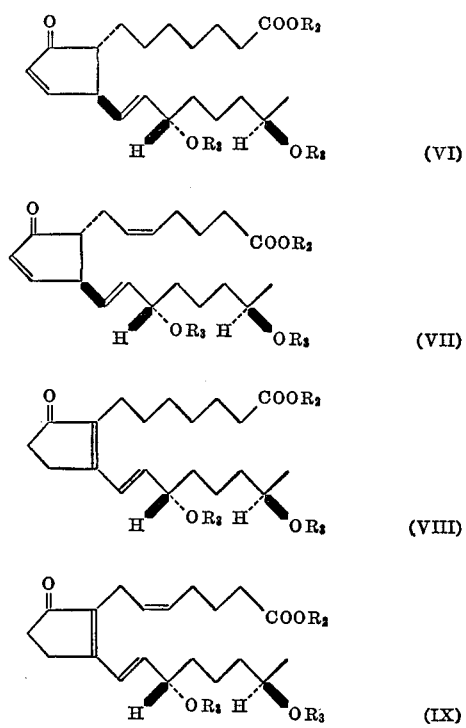

In Formulas VI, VII, VIII, and IX, $R_2$ is hydrogen, alkyl of one to 8 carbon atoms, inclusive, or a pharmacologically acceptable cation, and $R_3$ is hydrogen or alkanoyl of one to 8 carbon atoms, inclusive, provided that when $R_3$ is hydrogen, $R_2$ is alkyl of one to 8 carbon atoms, inclusive.

Molecules of the compounds encompassed by Formulas II to IX each have several centers of asymmetry. Each of these Formulas II to IX is intended to represent optically active compounds each with the same absolute configuration as optically active prostaglandin E ($PGE_1$), later named prostaglandin $E_1$ ($PGE_1$), and obtained from certain mammalian tissues, for example, sheep vesicular glands. See U.S. Pat. No. 3,069,322. See also later publications, for example, Bergstrom et al., J. Biol. Chem. 238, 3555 (1963), Bergstrom et al., Pharmacol. Rev. 20, 1 (1968), Hamberg et al., J. Biol. Chem. 241, 257 (1966), Hamberg et al., Nobel Symposium 2, Prostaglandins, Ed. S. Bergstrom and B. Samuelsson, pp. 63–70, Interscience Publishers, New York, 1967, Hamberg, European J. Biochem. 6, 147 (1968), and references cited in those.

In Formulas II to IX, a broken line attachment to the cyclopentene ring indicates a chain in alpha configuration, i.e., below the plane of the cyclopentene ring. A heavy solid line attachment to the cyclopentene ring indicates a chain in beta configuration, i.e., above the plane of the cyclopentane ring. The configuration of the side chain hydroxy at C–15 is alpha or S. The configuration of the side chain hydroxy at C–19 is beta or R.

With regard to Formulas VI, VII, VIII, and IX, examples of alkyl of one to 8 carbon atoms, inclusive, are methyl, ethyl, propyl, butyl, pentyl, hexyl, heptyl, octyl, and isomeric forms thereof.

Examples of alkanoyl of one to 8 carbon atoms, inclusive, are formyl, acetyl, propionyl, butyryl, valeryl, hexanoyl, heptanoyl, octanoyl, and isomeric forms thereof.

Pharmacologically acceptable cations within the scope of $R_1$ in Formulas II, III, IV, and V, and within the scope of $R_2$ in Formulas VI, VII, VIII, and IX are pharmacologically acceptable metal cations, ammonium ion, cations derived from pharmacologically acceptable amines, and pharmacologically acceptable quaternary ammonium cations.

Especially preferred metal cations are those derived from the alkali metals, e.g., lithium, sodium and potassium, and from the alkaline earth metals, e.g., magnesium and calcium, although cationic forms of other metals, e.g., aluminum, zinc, and iron, are within the scope of this invention.

Pharmacologically acceptable amine cations are those derived from primary, secondary, or tertiary amines. Examples of suitable amines are methylamine, dimethylamine, trimethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine; diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and loweralkyl derivatives thereof, e.g., 1-methylpiperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2 - amino-1-butanol, 2-amino-2-ethyl-1,3-propanediol, 2-amino-2-methyl-1-propanol, tris(hydroxymethyl)aminomethane, N-phenylethanolamine, N-(p-tertamylphenyl)diethanolamine, galactamine, N-methylglucamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethylammonium, and the like.

Prostanoic acid derivatives of Formulas II to IX are valuable therapeutic agents for the treatment of hypertension, in normalizing serum lipids and thus reducing the danger of ischaemic heart disease, and in treating central nervous system disorders in mammals including man. These compounds are administered by intravenous infusion of sterile isotonic saline solutions at the rate of about 0.01 to about 10, preferably, about 0.1 to about 0.2, microgram per kilogram of animal weight per minute. These compounds are also useful because they can be administered to laboratory animals, preferably rats, to produce animals containing high levels of the compounds. Such animals can then serve as test animals in the search for and study of compounds which are antagonists of the administered compounds and which, for that reason, would be useful in reversing the effects of inadvertent overdoses of the extremely potent Formula II to IX compounds and in the treatment of allergic conditions. For that purpose, the Formula II to IX compound is advantageously administered to the test animal by continuous intravenous infusion in sterile saline solution at the rate of about 0.01 to about 10, preferably 0.05 to 0.2, microgram per kilogram of animal weight per minute until the desired level of compound has been reached or until the desired response in the animal has been obtained. Infusion can then be continued or stopped depending on the particular use to be made of the test animal.

The compounds of Formulas II to IX and especially the PGA-type compounds of Formulas II, III, VI and VII, are useful in mammals, including man, as nasal decongestants. For this purpose, the compounds are used in a dose range of about 10 μg. to about 10 mg. per ml. of a pharmacologically suitable liquid vehicle or as an aerosol spray, both for topical application.

The PGA-type compounds of Formulas II, III, VI, and VII are useful in the treatment of asthma. For example, these compounds are useful as bronchodilators or as inhibitors of mediators, such as SRS–A, and histamine which are released from cells activated by an antigen-antibody complex. Thus, these compounds control spasm and facilitate breathing in conditions such as bronchial asthma, bronchitis, bronchiectasis, pneumonia and emphysema. For these purposes, these compounds are administered in a variety of dosage forms, e.g., orally in the form of tablets, capsules, or liquids; rectally in the form of suppositories; parenterally, subcutaneously, or intramuscularly, with intravenous administration being preferred in emergency situations; by inhalation in the form of aerosols or solutions for nebulizers; or by insufflation in the form of powder. Doses in the range of about 0.1 to 5 mg. per kg. of body weight are used 1 to 4 times a day, the exact dose depending on the age, weight, and condition of the patient and on the frequency and route of administration. For the above use these prostaglandins can be combined advantageously with other anti-asthmatic agents, such as sympathomimetics (isoproterenol, phenylephrine, ephedrine, etc.); xanthine derivatives (theophylline and aminophyllin); and corticosteroids (ACTH and predinisolone).

The PGA-type compounds of Formulas II, III, VI, and VII are also useful in mammals, including man and certain useful animals, e.g., dogs and pigs, to reduce and control excessive gastric secretion, thereby reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 1 μg. to about 2 mg. per kg. of body weight per minute, or in a total daily dose by injection or infusion in the range about 1 to about 50 mg. per kg. of body weight per day, the exact dose depending on the age, weight, and condition of the patient or animal, and on the frequency and route of administration.

The PGA-type compounds of Formulas II, III, VI, and VII increase the flow of blood in the mammalian kidney, thereby increasing volume and electrolyte content of the urine. For that reason, the PGA-type compounds are useful in managing cases of renal disfunction, especially in cases of severely impaired renal blood flow, for example, the hepatorenal syndrome and early kidney transplant rejection. In cases of excessive or inappropriate ADH (antidiuretic hormone; vasopressin) secretion, the diuretic effect of these compounds is even greater. In anephric states, the vasopressin action of these compounds is especially useful. Illustratively, the PGA-type compounds are useful to alleviate and correct cases of edema resulting, for example, from massive surface burns, and in the management of shock. For these purposes, the PGA-type compounds are preferably first administered by intravenous injection at a dose in the range 100 to 10,000 μg. per kg. of body weight or by intravenous infusion at a dose in the range 1 to 200 μg. per kg. of body weight per minute until the desired effect is obtained. Subsequent doses are given by intravenous, intramuscular, or subcutaneous injection or infusion in the range 0.5 to 5 mg. per kg. of body weight per day.

The PGB-type compounds of Formulas IV, V, VIII, and IX promote and accelerate the growth of epidermal cells and keratin in animals, including humans, useful domestic animals, pets, zoological specimens, and laboratory animals. For that reason, these compounds are useful to promote and accelerate healing of skin which has been damaged, for example, by burns, wounds, and abrasions, and after surgery. These compounds are also useful to promote and accelerate adherence and growth of skin autografts, especially small, deep (Davis) grafts which are intended to cover skinless areas by subsequent outward growth rather than initially, and to retard rejection of homografts.

For these purposes, these compounds are preferably administered topically at or near the site where cell growth and keratin formation is desired, advantageously as an aerosol liquid or micronized powder spray, as an isotonic aqueous solution in the case of wet dressings, or as a lotion, cream, or ointment in combination with the usual pharmaceutically acceptable diluents. In some instances, for example, when there is substantial fluid loss as in the case of extensive burns or skin loss due to other causes, systemic administration is advantageous, for example, by intravenous injection or infusion, separate or in combination with the usual infusions of blood, plasma, or substitutes thereof. Alternative routes of administration are subcutaneous or intramuscular near the site, oral, sublingual, buccal, rectal, or vaginal. The exact dose depends on such factors as the route of administration, and the age, weight, and condition of the subject. To illustrate, a wet dressing for topical application to second and/or third degree burns of skin area 5 to 25 square centimeters would advantageously involve use of an isotonic aqueous solution containing 1 to 500 μg./ml. of the PGB-type compound. Especially for topical use, these prostaglandins are useful in combination with antibiotics, for example, gentamycin, neomycin, polymyxin B, bacitracin, spectinomycin, and oxytetracycline, with other antibacterials, for example, mafenide hydrochloride, sulfadiazine, furazolium chloride, and nitrofurazone, and with corticoid steroids, for example, hydrocortisone, prednisolone, methylprednisolone, and fluprednisolone, each of those being used in the combination at the usual concentration suitable for its use alone.

The compounds of Formulas II to IX are used for the purposes described above in free acid form, in ester form, in dialkanoate form, in ester-dialkanoate form, or in pharmacologically acceptable salt form. When the alkyl ester form is used, preferred are esters with alkyl groups of one to 4 carbon atoms, inclusive. Of those alkyl, methyl and ethyl are especially preferred. When an alkanoate form is used, the diacetyl compounds are preferred. In Formulas VI, VII, VIII, and IX, it is contemplated that both $R_3$ be hydrogen or that both $R_3$ be alkanoyl.

When the compounds of Formulas II to IX are used for intravenous injection or infusion, as mentioned above, sterile aqueous isotonic solutions are preferred. For that purpose, it is preferred because of increased water solubility that a free acid or salt form be used. For subcutaneous or intramuscular injection, sterile solutions or suspensions of the acid, salt, ester, alkanoate, or ester-alkanoate form in aqueous or non-aqueous media are used. Tablets, capsules, and liquid preparations such as syrups, elixers, and simple solutions, with the usual pharmaceutical carriers, are used for oral or sublingual administration.

Prior to this invention, the only prostanoic acid derivatives isolated from natural sources have been substances designated prostaglandins. See, for example, Horton, Experientia, 15, 113–114 (1965). Each of the known prostaglandins is characterized by C–11α and C–15S hydroxy groups and a 13,14-trans double bond. In addition, prostaglandin $E_1$ ($PGE_1$) has an oxo moiety at C–9; prostaglandin $E_2$ ($PGE_2$) has an oxo moiety at C–9 and a 5,6-cis double bond; prostaglandin $E_3$ ($PGE_3$) has an oxo moiety at C–9, and 5,6-cis and 17,18-cis double bonds; prostaglandin $F_{1\alpha}$ ($PGF_{1\alpha}$) has a C–9α hydroxy group; prostaglandin $F_{2\alpha}$ ($PGF_{2\alpha}$) has a C–9α hydroxy group and a 5,6-cis double bond; prostaglandin $F_{3\alpha}$ ($PGF_{3\alpha}$) has a C–9α hydroxy group, and 5,6-cis and 17,18-cis double bonds.

Other prostanic acid derivatives have been obtained by chemical transformations of the above-mentioned prostaglandins. For example, borohydride reduction of the C–9 oxo moiety of $PGE_3$, results in the formation of $PGF_{1\alpha}$ and the corresponding isomer with the C–9 hydroxy group in the α configuration, $PGF_{1\beta}$. See, for example, Bergstrom et al., Acta. Chem. Scand., 16, 969–974 (1962).

Prior to this invention, prostanoic acid derivatives with oxygen at other than C–1, C–9, C–11, and C–15 had not been described. It has now been discovered that certain prostanoic acid derivatives with hydroxy groups at C–19 can be isolated from human seminal plasma by the novel process of this invention.

Earlier work with human seminal plasma resulted in the isolation of $PGE_1$, $PGE_2$, $PGE_3$, $PGF_{1\alpha}$, and $PGF_{2\alpha}$; Samuelsson, J. Biol. Chem. 238, 3229–3234 (1963). In that work, it was discovered that reversed phase partition chromatography on a hydrophobic diatomaceous earth (Super-Cel) support would separate individual "PGE type" compounds from each other, and individual "PGF type" compounds from each other, but would not completely separate the "PGE type" compounds from the "PGF type" compounds. It was also discovered in that work that partition chromatography on silicic acid would separate "PGE type" mixtures from "PGF type" mixtures but would not separate the individual "PGE type" compounds from each other or the individual "PGF type" compounds from each other.

Also in the earlier work of Samuelsson, ibid., use was made of earlier observations that both "PGE type" and "PGF type" compound concentrations can be estimated by measuring smooth muscle-stimulating activity on isolated rabbit duodenum, the activity being expressed in $PGE_1$-intestinal units, one such unit corresponding to one microgram of a standard prepared from crystalline $PGE_1$. That measurement does not, of course, distinguish between "PGE type" and "PGF type" compounds.

In working with the "PGE type" compounds in human seminal plasma, Samuelsson, ibid., also used the earlier observation that treatment of a "PGE type" compound with sodium hydroxide solution causes formation of a chromophore with an ultraviolet absorption maximum at 278 mμ. "PGF type" compounds do not form that chromophore on treatment with sodium hydroxide. Therefore, that reaction can be used to estimate "PGE type" compound concentrations but not "PGF type" compound concentrations.

The novel process of this invention differs in several substantial respects from the process described by Samuelsson, ibid. Hereinafter, for convenience, the latter process will be referred to as the Samuelsson process to distinguish it from the novel process of this invention.

In the Samuelsson process, the total mixture of smooth muscle-stimulating compounds was extracted from human seminal plasma, partitioned between petroleum ether and an ethanol-water solution, and then subjected to partition chromatography on silicic acid, various mixtures of ethyl acetate and benzene being used for elution, and the content of each eluate fraction being measured both by weight and by smooth muscle-stimulating activity, i.e., in terms of $PGE_1$-intestinal units. Next in the Samuelsson process, certain eluate fractions representing a peak of smooth muscle-stimulatory activity thought to be due to various "PGE-type" compounds were combined and subjected to a combination of reversed phase partition chromatography, partition chromatography, and thin layer chromatography, whereby $PGE_1$, $PGE_2$, and $PGE_3$ were separated, and isolated and identified as methyl esters.

Then, in the Samuelsson process, certain other eluate fractions representing another and slower moving peak of smooth muscle-stimulating activity thought to be caused by various "PGF-type" compounds were combined and subjected to reversed phase partition chromatography, the content of each eluate fraction being measured by smooth muscle-stimulatory activity. Certain eluate fractions from the latter chromatographic process, representing a peak of smooth muscle-stimulating activity, were combined and evaporated to give a residue which was treated with diazomethane to produce methyl esters of the various prostanoic acids in those fractions. That methyl ester mixture was then subjected to thin layer chromatography whereby the methyl ester of $PGF_{1\alpha}$ and the methyl ester of $PGF_{2\alpha}$ were separated, isolated, and identified.

In the novel process of this invention, the acidic fraction of a lipid extract of human seminal plasma is obtained by extraction and preliminary purification, substantially as described by Samuelsson, ibid. That acidic fraction is then subjected to partition chromatography on silicic acid, substantially as described by Samuelsson, ibid., except that the content of each eluate fraction is measured by evaporating an aliquot of each fraction to dryness, treating the residue with 0.5 N sodium hydroxide in 50% aqueous ethanol, and, after 30 minutes, measuring the ultraviolet absorbancy at 278 m$\mu$.

By plotting eluate fraction number against ultraviolet absorbancy at 278 m$\mu$, four main peaks of absorbancy are observed in this novel process. When a small amount of $PGF_{3\alpha}$ containing tritium in place of hydrogen on the 9-hydroxyl group is added to the mixture prior to the partition chromatography, and the tritium activity of the various eluate fractions measured, a single peak of tritium activity is observed. That tritium activity peak coincides roughly with the third peak (in order of ease of elution from the chromatogram) of ultraviolet absorbancy.

Since it was observed by Samuelsson, ibid., that "PGF-type" compounds are present in human seminal plasma, and since partition chromatography on silicic acid as described by Samuelsson, ibid., does not separate the individual "PGF-type" compounds from each other, the third peak of ultraviolet absorbancy obtained by the novel process of this invention must contain all of the "PGF-type" compounds in the human seminal plasma.

As mentioned above, it is known that "PGF-type" compounds do not produce a chromophore which absorbs at 278 m$\mu$ on treatment with dilute sodium hydroxide solution. Therefore, it was completely unexpected and surprising that eluate fractions expected to contain "PGF-type" compounds would also contain compounds which give the 278 m$\mu$ chromophore on treatment with dilute sodium hydroxide solution. Thus, an essential part of the novel process of this invention is the step of detecting unexpected compounds with substantially the same mobility as "PGF-type" compounds during partition chromatography on silicic acid, by treatment of aliquots of eluate fractions with alkali metal hydroxides, preferably sodium hydroxide or potassium hydroxide, and preferably in dilute solution, and then measurement of the ultraviolet absorbancy of the treated eluate at 278 m$\mu$.

The nature of the solvent is not critical as long as both alkali metal hydroxide and compounds to be treated are in solution together. A mixture of water and a lower alkanol such as methanol or ethanol is preferred. The eluate aliquot can be treated directly with the alkali metal hydroxide or the aliquot can first be evaporated to dryness.

Further in the novel process of this invention, the eluates of the third ultraviolet absorbancy peak, obtained by partition chromatography as described above by the novel process of this invention and containing the unexpected compounds of this invention as well as "PGF-type" compounds, are combined and subjected to reversed phase chromatography. An essential aspect of that novel reversed phase chromatography step of the novel process of this invention is that the step provide an essentially complete separation of $PGF_{1\alpha}$ and $PGF_{2\alpha}$ from the unexpected compounds of this invention. Another important aspect of this reversed phase chromatography step is that it provide a substantial although not necessarily complete separation of the unexpected compounds of this invention from each other.

The reversed phase partition chromatography which is part of the novel process of this invention is similar to that described by Norman et al., J. Biol. Chem., 233, 872–885 (1958). It was discovered quite unexpectedly, however, that use of a mixture of equal volumes of chloroform and isooctanol as the stationary phase on hydropholic kieselguhr (diatomite or diatomaceous earth), and a mixture of 114 volumes of methanol and 186 volumes of water as the moving phase would permit the compounds of this invention to pass through the chromatographic column substantially more rapidly than the $PGF_{1\alpha}$ and $PGF_{2\alpha}$, and thus be separated from the latter compounds. Moreover, by this novel chromatographic procedure, the four 19-hydroxyprostanic acids of this invention, i.e., the compounds of Formulas II, III, IV and V, quite unexpectedly moved through the chromatographic column at substantially different rates, thus effecting a substantial separation of those four compounds from each other.

The above-described novel reversed phase partition chromatographic separation differs from the reversed phase chromatographic separation described by Samuelsson, ibid., for the separation of $PGF_{1\alpha}$ and $PGF_{2\alpha}$ not only in the result obtained but also in the means of obtaining the result. A substantially smaller proportion of methanol is present in the moving phase in the novel process of this invention than was used in the Samuelsson process. The latter process used a moving phase containing 135 volumes of methanol and 165 volumes of water. In the novel process of this invention, 114 volumes of methanol and 186 volumes of water is present in the moving phase. In the novel process of this invention, the moving phase can contain methanol and water in volume-volume ratios ranging from about 110 volumes of methanol plus 190 volumes of water to about 120 volumes of methanol plus 180 volumes of water. When larger proportions of methanol are used, $PGF_{1\alpha}$ and $PGF_{2\alpha}$ tend to remain with the compounds of this invention during chromatography. When smaller amounts of methanol are used, the separation of the individual compounds of this invention is poorer than when a methanol-water mixture within the preferred range is used.

The above-described novel reversed phase chromatography process differs from the reversed phase part of the Samuelsson process in another significant manner. In the Samuelsson process, the content of the various eluate fractions from the reversed phase partition chromatography was determined by measuring smooth muscle-stimulatory activity of those fractions. In this part of the novel process of this invention, the content of the various eluate fractions was measured by determining the ultraviolet absorbancy of each fraction at 278 m$\mu$ both before and after treatment with a dilute alkali metal hydroxide solution.

preferably sodium hydroxide or potassium hydroxide, as described above for the partition chromatography on silicic acid. Since the Samuelsson process had yielded only "PGF-type" compounds and since such compounds do not have a chromophore absorbing at 278 mµ nor yield such a chromophore on treatment with dilute alkali, it was completely unexpected and surprising that compounds could be detected in these eluate fractions in that manner.

By the above-described novel reversed phase partition chromatography process, a substantial separation of the unexpected compounds of this invention is obtained. The novel 19-hydroxyprostanoic acid of Formula III moves more rapidly on the chromatographic column than the other 19-hydroxyprostanoic acids of Formulas II, IV, and V. Indeed, certain of the first group of eluate fractions obtained from the reversed phase chromatograms contain the Formula III 19-hydroxyprostanoic acid essentially free of Formula II, IV and V 19-hydroxyprostanoic acids. Hence, as will be described in greater detail hereinafter, those fractions can be combined and the Formula III 19-hydroxyprostanoic acid isolated therefrom in essentially pure form by conventional techniques, for example, by evaporation of the solvents in the combined eluates. If desired, the essentially pure evaporation residue can be crystallized from a suitable solvent or mixture of solvents or subjected to chromatography, preferably preparative thin layer chromatography by the method of Gréen et al., J. Lipid Research 5, 117–120 (1964). Especially preferred as thin layer chromatography systems for that purpose are mixtures of ethyl acetate-acetic acid-methanol-2,2,4-trimethylpentane-water, especially 110:10:15:10:100 by volume, and mixtures of ethyl acetate-acetic acid-2,2,4-trimethylpentane-water, especially 110:20:30:100 by volume.

The 19-hydroxyprostanoic acids of Formulas II and V are usually not completely separated by the above-described novel reversed phase partition chromatographic process. When essentially pure samples of those compounds are desired, it is preferred to combine the various eluate fractions which contain them and then isolate the mixture by conventional methods, for example, evaporation of the solvents in the combined eluates. The mixture of the two 19-hydroxyprostanoic acids is then separated by preparative thin layer chromatography as described by Gréen et al., ibid., preferably using silica gel containing a small amount of silver nitrate, advantageously, about one part by weight of silver nitrate to about 25 parts of the silver gel, added as described by Gréen et al., ibid. Also, it is preferred to use a mixture of ethyl acetate-acetic acid-methanol-2,2,4-trimethylpentane-water, especially 110:10:15:10:100 by volume as the solvent system. With that preferred procedure, the Formula II 19-hydroxyprostanoic acid has an $R_F$ value about 0.68 and the Formula V 19-hydroxyprostanoic acid has an $R_F$ value about 0.48, thus indicating essentially complete separation. The essentially pure Formula II and Formula V 19-hydroxyprostanoic acids can be isolated from the thin layer chromatogram by conventional techniques, for example, as described by Gréen et al., ibid.

The novel 19-hydroxyprostanoic acid of Formula IV moves more slowly on the reversed phase partition chromatographic column than any of the Formula II, III, and V 19-hydroxyprostanoic acids. Therefore a group of the last eluate fractions from the reversed phase partition chromatogram will contain this substance in substantially pure form. However, small amounts of Formula II and perhaps traces of Formula V 19-hydroxyprostanoic acids may be present in those final eluates. To obtain the Formula IV 19-hydroxyprostanoic acid in essentially pure form, the combined final eluate fractions are evaporated to dryness and the residue subjected to preparative thin layer chromatography as described by Gréen et al., ibid., preferably using silica gel containing a small amount of silver nitrate as described above, and the specific ethyl acetate-acetic acid-methanol-2,2,4-trimethylpentane-water mixture described above. The Formula IV 19-hydroxyprostanoic acid is thereby separated from the other 19-hydroxyprostanoic acids and can be isolated according to the Gréen et al., ibid. The resulting essentially pure Formula IV 19-hydroxyprostanoic acid gives a single spot with $R_F$ 0.36 when subjected to thin layer chromatography silicic acid with a mixture of ethyl acetate-acetic acid-2,2,4-trimethylpentane-water, 110:20:30:100.

If it is desired to obtain only Formula IV and/or Formula V 19-hydroxyprostanoic acids, i.e., only those compounds with $C_{8(12)}$ double bonds, it is advantageous to treat the entire mixture of prostanoic acids in the third ultraviolet absorbancy peak of the above-described silicic acid partition chromatogram with dilute alkali metal hydroxide solution, preferably substantially as described for the compound detection method in the above-described novel reversed phase partition chromatography except on an appropriately larger scale. That treatment converts the Formula II 19-hydroxyprostanoic acid to the Formula IV 19-hydroxyprostanoic acid, and the Formula III 19-hydroxyprostanoic acid to the Formula V 19-hydroxyprostanoic acid. The reaction involved is isomerism of the $C_{10(11)}$ double bond to the $C_{8(12)}$ position. It is the $C_{8(12)}$ double bond in conjugation with the 9-oxo group and the $C_{13(14)}$ double bond which is the chromophore that absorbs ultraviolet light at 278 mµ. The resulting mixture of Formula IV and Formula V 19-hydroxyprostanoic acids is then readily separated by the combination of the novel reversed phase partition chromatography and the novel preparative thin layer chromatography, each as described above. Essentially pure Formula IV and Formula V 19-hydroxyprostanoic acids are thereby obtained.

Alternatively, the essentially pure Formula II and Formula III 19-hydroxyprostanoic acids can individually be transformed to essentially pure Formula IV and Formula V 19-hydroxyprostanoic acids, respectively, by the above-described treatment with dilute alkali metal hydroxide solution.

The 19-hydroxyprostanoic acids of this invention, i.e., compounds of Formulas II, III, IV, and V, can be transformed into various types of esters, for example, compounds of Formulas VI to IX wherein $R_2$ is an alkyl moiety and $R_3$ is hydrogen, wherein $R_3$ is an alkanoyl moiety and $R_2$ is hydrogen or a pharmacologically acceptable cation, and wherein $R_2$ is an alkyl moiety and $R_3$ is an alkanoyl moiety, all as defined above.

Esterification of the carboxyl moiety in Formula II, III, IV, and V 19-hydroxyprostanoic acids and in Formula VI, VII, VIII, and IX compounds wherein $R_2$ is hydrogen and $R_3$ is hydrogen or alkanoyl can be accomplished by interaction of the free acid with the appropriate diazohydrocarbon. For example, when diazomethane is thus used, methyl esters are produced. Similar use of diazoethane, diazobutane, and 1-diazo-2-ethyl-hexane, and the like gives ethyl, butyl, and 2-ethylhexyl esters of the Formula II to IX acids.

Esterification with the diazohydrocarbons is carried out by mixing a solution of the diazohydrocarbon in a suitable inert solvent, preferably diethyl ether, with the prostanoic acid reactant, advantageously in the same or a different inert diluent. After the esterification reaction is complete, the solvent is removed by evaporation and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley and Sons, Inc., New York, N.Y., vol. 8, pp. 389–394 (1954).

An alternative method for esterification of the carboxyl moiety of Formula II to IX 19-hydroxyprostanoic acids comprises transformation of the free acid to the corresponding silver salt, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

Carboxyacylation of the two hydroxy groups in the Formula II, III, IV, and V 19-hydroxyprostanoic acids and in the Formula VI, VII, VIII, and IX compounds wherein $R_2$ is hydrogen or alkyl and $R_3$ is hydrogen is accomplished by interaction of the hydroxy compound with a carboxyacylating agent, preferably the anhydrides of alkanoic acids. For example, use of acetic anhydride gives the corresponding diacetate. Similar use of propionic anhydride, butyric anhydride, and isobutyric anhydride, gives the corresponding dicarboxyacylates.

The carboxyacylation is advantageously carried out by mixing the hydroxy compound and the acid anhydride preferably in the presence of a tertiary amine such as pyridine or triethylamine. A substantial excess of the anhydride should be used, preferably about 10 to about 10,000 moles of anhydride per mole of the hydroxy compound reactant. The excess anhydride serves as a reaction diluent and solvent. An inert organic diluent, for example, dioxane, can be added. It is preferred to use enough of the tertiary amine to neutralize the carboxylic acid produced by the reaction as well as any free carboxyl groups present in the hydroxy compound reactant.

The carboxyacylation reaction is preferably carried out in the range about 0° to about 100° C. The necessary reaction time will depend on such factors as the reaction temperature and the nature of the anhydride and tertiary amine reactants. With acetic anhydride, pyridine, and a 25° C. reaction temperature, a 12 to 24-hour reaction time should be used.

The carboxyacylated product is isolated from the reaction mixture by conventional methods. For example, the excess anhydride can be decomposed with water, and the resulting mixture acidified and then extracted with a solvent such as diethyl ether. The desired carboxyacylate will usually be extracted by the ether and is recoverable therefrom by evaporation. If desired, the carboxyacylate can be purified by conventional methods, preferably by chromatography.

Each of the above-described 19-hydroxyprostanoic acids, i.e., Formulas II, III, IV, and V, and Formulas VI, VII, VIII, and IX wherein $R_2$ is hydrogen are transformed to pharmacologically acceptable salts by neutralization with appropriate amounts of the corresponding inorganic or organic base, examples of which correspond to the cations listed above. These transformations can be carried out by a variety of procedures known in the art to be generally useful for the preparation of inorganic, i.e., metal or ammonium, salts, amine acid addition salts, and quaternary ammonium salts. The choice of procedure will depend in part upon the solubility characteristics of the particular salt to be prepared. In the case of the inorganic salts, it is usually suitable to dissolve the 19-hydroxyprostanoic acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the Formula II to IX 19-hydroxyprostanoic acid. Evaporation of the water or addition of a water-miscible solvent of moderate polarity, for example, a lower alkanol or a lower alkanone gives the solid inorganic salt if that form is desired.

To produce an amine salt, the 19-hydroxyprostanoic acid can be dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it can usually be obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the 19-hydroxyprostanoic acid with the stoichiometric amount of the corresponding quaternary ammonium hydroxide in water solution, followed by evaporation of the water.

As discussed above, the novel Formula II, III, IV, and V prostanoic acid derivatives of this invention are obtained from human seminal plasma, along with numerous other prostanoic acid derivatives, for example, $PGE_1$, $PGE_2$, and $PGE_3$. These other prostanoic acid derivatives have different biological and pharmacological properties than the novel compounds of this invention. In order to be useful for the intended pharmacological purposes set forth hereinabove, each of the novel Formula II, III, IV, and V compounds must be essentially free of these other prostanoic acids. Moreover, human seminal plasma is known to contain many other substances, for example, proteins, enzymes, cellular material, and numerous other organic acids or salts thereof. The novel Formula II, III, IV, and V compounds of this invention must also be essentially free of these other human seminal plasma constituents which would also interfere with the intended uses of these novel compounds. By the term "essentially free" here is meant a degree of freedom from these impurities such that these novel compounds are suitable for their intended pharmacological uses, including parenteral administration to humans. When these novel compounds are purified to this degree, they are considered to be essentially pure and useable for all of the above-described pharmacological purposes.

The invention can be more fully understood by the following examples.

EXAMPLE 1.—ISOLATION OF 19-HYDROXY-PROSTANOIC ACIDS FROM HUMAN SEMINAL PLASMA (A) Extraction and preliminary purification Samples of human seminal plasma are obtained from the source described by Samuelsson, ibid., and are added to ethanol and stored at −20° C. until processed.

A 650-ml. portion of plasma in 2000 ml. of ethanol is centrifuged at about 25° C., and the clear supernatant is decanted. The sediment is resuspended in 2500 ml. of ethanol and the mixture is centrifuged. The combined supernatants are filtered, and evaporated to 200 ml. at 10 mm. pressure and 40° C. The resulting solution is then mixed with 200 ml. of water, and the mixture is acidified to pH 3 with hydrochloric acid.

The acidified solution is extracted three times with diethyl ether. The diethyl ether extracts are combined and washed with successive portions of water until further water washings are neutral. The washed diethyl ether extracts are then evaporated to dryness under reduced pressure, and the residue is subjected to a three-stage distribution between petroleum ether and ethanol-water (2:1). The combined aqueous ethanol phases are evaporated to a small volume, and then diluted with water, acidified, and extracted three times with diethyl ether. The combined diethyl ether extracts are evaporated to give 541 mg. of residue.

(B) Partition chromatography on silicic acid

The residue (541 mg.) from Part A is mixed with 25 micrograms of $PGF_{3\alpha}$ containing tritium in place of hydrogen in the 9-hydroxy group. (Samuelsson, Biochem. Biophys., Acta 84, 709 (1964)). The mixture is then subjected to partition chromatography on 25 g. of silicic acid, eluting with benzene containing increasing concentrations of ethyl acetate, as described by Samuelsson, ibid. Each eluate fraction is 42 ml. Fractions 1 to 6 are eluted with ethyl acetate-benzene 3:7 (v.:v.). Fractions 7 to 27 are eluted with ethyl acetate-benzene 6:4 (v.:v.). Fractions 28 to 39 are eluted with ethyl acetate-benzene 8:2 (v.:v.). A small aliquot of each fraction is evaporated to dryness, and the residue is mixed with 0.5 N sodium hydroxide in 50% aqueous ethanol and allowed to stand at about 25° C. for 30 minutes. The ultraviolet absorbancy at 278 m$\mu$ is then measured. Four main peaks of ultraviolet absorbancy are observed among the successive eluate fractions.

The radioactivity of each eluate fraction, and hence the $PGF_{3\alpha}$ content of each, is measured with a gas flow counter (Frieseke-Hoepfner FH 51) in the proportional range. The radioactive fractions coincide roughly with the third main peak of ultraviolet absorbancy.

(C) Reversed phase partition chromatography

The eluate fractions representing the third peak of ultraviolet absorbancy are combined and evaporated to dryness to give 74 mg. of residue. That residue is subjected to reversed phase chromatography according to the procedures described by Norman et al., J. Biol. Chem. 233, 872 (1958). See also references cited in Norman et al. An 18-gram column is used. The moving phase of the solvent system is methanol-water 114:186 (v.:v.). The stationary phase of the solvent system is chloroform-isooctanol 15:15 (v.:v.). The ultraviolet absorbancy of an aliquot of each eluate fraction is measured at 278 m$\mu$ before and after treatment with sodium hydroxide solution as described in Part B, above.

FIG. 1 shows the results obtained in the above-described reversed phase partition chromatography. The solid line represents absorbancy at 278 m$\mu$ for the various eluate fractions after treatment with sodium hydroxide solution. The dotted line with solid points represents absorbancy of the various eluate fractions before treatment with sodium hydroxide solution. The dashed line with open points represents the calculated difference in absorbancy between the solid line and the broken line with solid points. Thus each point on the broken line with open points represents an absorbancy increase due to treatment of an eluate fraction aliquot with sodium hydroxide solution, and hence is a measure of the amount of material in that fraction which does not absorb at 278 m$\mu$ before treatment with sodium hydroxide but which does absorb after that treatment.

(D) Thin layer chromatography and characterization

Thin layer chromatography described below is carried out according to the procedures described by Gréen et al., J. Lipid Research 5, 117–120 (1964). Two solvent systems are used. System A consists of ethyl acetate-acetic acid-methanol-2,2,4 - trimethylpentane-water, 110:10:15:10:100 by volume. System B consists of ethyl acetate-acetic acid-2,2,4-trimethylpentane-water, 110:20:30:100 by volume. System A is used with a mixture of silica gel and silver nitrate, 25:1 by weight. System B is used with silica gel. In both cases, the specific silica gel and the preparation and use of the plates are as described by Gréen et al., ibid.

(a) Fractions 28 to 35 (see FIG. 1) from the above-described reversed phase partition chromatography are combined and evaporated to dryness to give 10 mg. of essentially pure 15,19-dihydroxy-9-oxoprosta-cis-5,10-trans-13-trienoic acid.

U.V. (ethanol) 217 m$\mu$ ($\epsilon$=10,000).
I.R. (principal bands; chloroform solution) 5.86, 6.31, 10.3$\mu$.
Thin layer chromatography:
 A single spot with $R_F$ 0.52 using solvent system A.
 A single spot with $R_F$ 0.38 using solvent system B.

(b) Fractions 40 to 52 (see FIG. 1) from the above-described reversed phase partition chromatography are combined and evaporated to dryness to give 19 mg. of residue. Preparative thin layer chromatography according to Gréen et al., ibid., using solvent system A separates that residue into two essentially pure compounds, one with $R_F$ 0.68 and one with $R_F$ 0.48.

The compound with $R_F$ 0.68 is 15,19-dihydroxy-9-oxoprosta-10,trans-13-dienoic acid.

U.V. (ethanol) 217 m$\mu$ ($\epsilon$=11,000).
I.R. (principal bands; chloroform solution) 5.86, 6.31, 10.3$\mu$.
Thin layer chromatography: A single spot with $R_F$ 0.38 using solvent system B.

The compound with $R_F$ 0.48 is 15,19-dihydroxy-9-oxoprosta-cis-5,8(12),trans-13-trienoic acid.

U.V. (ethanol) 278 m$\mu$ ($\epsilon$=20,000).
I.R. (principal bands; chloroform solution) 5.92, 6.09, 6.26, 10.3$\mu$.
Thin layer chromatography: A single spot with $R_F$ 0.37 using solvent system B.

(c) Fractions 54 to 61 (see FIG. 1) from the above-described reversed phase partition chromatography are combined and evaporated to dryness to give a residue. Preparative thin layer chromatography according to Gréen et al., ibid., using solvent system A gives a spot from which essentially pure 15,19-dihydroxy-9-oxoprosta-8(12),trans-13-dienoic acid is isolated.

U.V. (ethanol) 278 m$\mu$ ($\epsilon$=21,000).
I.R. (principal bands; chloroform solution) 5.92, 6.09, 6.26, 10.3$\mu$.
Thin layer chromatography: A single spot with $R_F$ 0.36 using solvent system B.

EXAMPLE 2.—ISOLATION OF 8(12)-UNSATURATED 19 - HYDROXYPROSTANOIC ACIDS FROM HUMAN SEMINAL PLASMA

Following the procedure of Example 1, Parts A and B, the acidic fraction of a lipid extract of a batch of human seminal plasma is purified and subjected to partition chromatography on silicic acid. The eluate fractions containing the third main peak of ultraviolet absorbancy at 278 m$\mu$ are combined and evaporated to dryness to give 24 mg. of residue. That residue is then mixed with 0.5 N sodium hydroxide in 50% aqueous ethanol, and the mixture is heated for 45 minutes at 40° C. The resulting solution is then acidified and extracted repeatedly with diethyl ether. The diethyl ether extracts are combined and evaporated to dryness to give a residue which is subjected to reversed phase chromatography, following the procedure of Example 1, Part C. Only two main peaks of ultraviolet absorbancy appear. The eluate fractions containing the first peak of ultraviolet absorbancy are combined and evaporated to give 10.0 mg. of essentially pure 15,19-dihydroxy-9-oxoprosta-cis-5,8(12),trans-13-trienoic acid; thin layer chromatography as in Example 1, Part D, gives a single spot with the same $R_F$ given in Example 1.

The eluate fractions containing the second peak of ultraviolet absorbancy are combined and evaporated to dryness to give 11.0 mg. of essentially pure 15,19-dihydroxy-9-oxoprosta-8(12),trans-13-dienoic acid; thin layer chromatography as in Example 1, Part D, gives a single spot with the same $R_F$ given in Example 1.

EXAMPLE 3.—CONVERSION OF 10(11)-UNSATURATED 19-HYDROXYPROSTANOIC ACIDS TO 8(12) - UNSATURATED 19 - HYDROXYPROSTANOIC ACIDS

Following the procedure described in Example 2 for the treatment of the 19-hydroxyprostanoic acid mixture with sodium hydroxide solution, essentially pure 15,19-dihydroxy-9-oxoprosta - 10,trans-13-dienoic acid and essentially pure 15,19-dihydroxy-9-oxoprosta-cis-5,10-trans-13-trienoic acid are separately transformed by sodium hydroxide treatment to essentially pure 15,19-dihydroxy-9-oxoprosta - 8(12),trans-13-dienoic acid and essentially pure 15,19-dihydroxy-9-oxoprosta-cis-5,8(12)-trans-13-trienoic acid, respectively.

EXAMPLE 4.—METHYL 15,19-DIHYDROXY-9-OXOPROSTA-10,TRANS-13-DIENOATE

Essentially pure 15,19-dihydroxy-9-oxoprosta-10,trans-13-dienoic acid (2 mg.) is dissolved in a mixture of methanol and diethyl ether 1:9. A diethyl ether solution of diazomethane (about 200 mg.) is added, and the mixture allowed to stand at about 25° C. for 5 minutes. The reaction mixture is then evaporated to dryness to give methyl 15,19-dihydroxy-9-oxoprosta-10,trans-13-dienoate.

I.R. (principal bands; chloroform solution) 5.86, 6.31, 10.3μ.

Mass spectrum: 279, 299, 317, 348, 366 m/e on apparatus of Ryhage, Arkiv Kemi, 16, 19 (1960).

EXAMPLE 5.—METHYL 15,19-DIHYDROXY-9-OXOPROSTA-CIS-5,10,TRANS-13-TRIENOATE

Following the procedure of Example 4, essentially pure 15,19-dihydroxy - 9-oxoprosta-cis - 5,10,trans-13-trienoic acid is transformed to methyl 15,19-dihydroxy-9-oxoprosta-cis-5,10,trans-13-trienoate.

I.R. (principal bands; chloroform solution) 5.86, 6.31, 10.3μ.

Mass spectrum: 315, 328, 346, 364 m/e on apparatus of Ryhage, ibid.

N.M.R.: Multiplets at 5.25–5.50 and 5.50–5.75 p.p.m. (δ); doublet at 1.15 p.p.m. (δ); singlet at 1.25 p.p.m. (δ). Spectrum taken with a Varian A–60 spectrophotometer on deuterochloroform solution with tetramethylsilane as internal standard.

EXAMPLE 6.—METHYL 15,19-DIHYDROXY-9-OXOPROSTA-8(12),TRANS-13-DIENOATE

Following the procedure of Example 4, essentially pure 15,19-dihydroxy - 9 - oxoprosta-8(12),trans - 13 - dienoic acid is transformed to methyl 15,19-dihydroxy-9-oxoprosta-8(12),trans-13-dienoate.

I.R. (principal bands; chloroform solution) 5.92, 6.09, 6.26, 10.3μ.

EXAMPLE 7.—METHYL 15,19-DIHYDROXY-9-OXOPROSTA-CIS-5,8(12),TRANS-13-TRIENOATE

Following the procedure of Example 4, essentially pure 15,19 - dihydroxy - 9 - oxoprosta-cis-5,8(12),trans-13-trienoic acid is transformed to methyl 15,19-dihydroxy-9-oxoprosta-cis-5,8(12),trans-13-trienoate.

I.R. (principal bands; chloroform solution) 5.92, 6.09, 6.26, 10.3μ.

Also following the procedure of Example 4 but substituting for diazomethane, diazoethane; diazobutane; and 1-diazo-2-ethylhexane; there are obtained the ethyl, butyl, and 2-ethylhexyl, esters, respectively, of 15,19-dihydroxy-9-oxoprosta-10,trans-13-dienoic acid. In the same manner, essentially pure 15,19-dihydroxy - 9 - oxoprosta-cis-5,10, trans-13-trienoic acid, 15,19-dihydroxy-9-oxoprosta-8-(12),trans-13-dienoic acid, and 15,19-dihydroxy-9-oxoprosta-cis-5,8(12),trans-13-trienoic acid are transformed to the corresponding ethyl, butyl, and 2-ethylhexyl esters.

EXAMPLE 8.—METHYL 15,19-DIACETOXY-9-OXOPROSTA-10,TRANS-13-DIENOATE

Methyl 15,19-dihydroxy-9-oxoprosta-10,trans-13-dienoate (2 mg.) is mixed with acetic anhydride (0.5 ml.) and pyridine (0.5 ml.). The resulting mixture is allowed to stand at 25° C. for 18 hours. The reaction mixture is then cooled with ice, diluted with water, and acidified with dilute hydrochloric acid to pH 1. That mixture is then extracted three times with diethyl ether. The diethyl ether extracts are combined and washed successively with 2 N hydrochloric acid, 1 N sodium bicarbonate solution, and water. The ether is then evaporated under reduced pressure to give methyl 15,19-diacetoxy-9-oxoprosta-10, trans-13-dienoate. On oxidative ozonolysis followed by reaction with diazomethane, that compound gives methyl 2,6-diacetoxyheptanoate and trimethyl octane-1,2,8-tricarboxylate.

Following the procedure of Example 8, methyl 15,19-dihydroxy-9-oxoprosta-8(12),trans - 13 - dienoate, methyl 15,19-dihydroxy - 9-oxoprosta-cis-5,10,trans-13-trienoate, and methyl 15,19-dihydroxy - 9 - oxoprosta-cis-5,8(12), trans-13-trienoate are transformed separately to methyl 15,19 - diacetoxy - 9 - oxoprosta-8(12),trans-13-dienoate, methyl 15,19-diacetoxy - 9 - oxoprosta-cis-5,10,trans-13-trienoate, and methyl 15,19-diacetoxy-9-oxoprosta-cis-5,8(12),trans-13-trienoate, respectively. On oxidative ozonolysis followed by reaction with diazomethane, the methyl 15,19-diacetoxy - 9 - oxoprosta-cis-5,10,trans-13-trienoate gives dimethyl glutarate, trimethyl tricarballylate, and methyl 2,6-diacetoxyheptanoate.

Also following the procedure of Example 8 but substituting for the acetic anhydride, propionic anhydride and butyric anhydride; there are obtained the corresponding 15,19-dicarboxyacyl derivatives of methyl 15,19-dihydroxy-9-oxoprosta-10,trans-13-dienoate. In a similar manner, the same 15,19-dicarboxyacyl derivatives of methyl 15,19 - dihydroxy - 9 - oxoprosta-8(12),trans-13-dienoate, methyl 15,19-dihydroxy - 9 - oxoprosta-cis-5,10, trans-13-trienoate, and methyl 15,19-dihydroxy-9-oxoprosta-cis-5,8(12),trans-13-trienoate is prepared. In a similar manner, each of the other esters of the novel 19-hydroxyprostanoic acids of this invention mentioned above is reacted with acetic anhydride or with each of the other above-mentioned anhydrides to produce the corresponding 15,19-dicarboxyacyl derivatives.

Also following the procedure of Example 8, essentially pure 15,19-dihydroxy-9-oxoprosta-10,trans - 13 - dienoic acid, 15,19-dihydroxy - 9 - oxoprosta-8(12),trans-13-dienoic acid, 15,19-dihydroxy-9-oxoprosta-cis-5,10,trans-13-trienoic acid, and 15,19-dihydroxy-9-oxoprosta-cis-5,8-(12),trans-13-trienoic acid are each separately reacted with acetic anhydride or with each of the other above-mentioned anhydrides to produce the corresponding 15, 19-dicarboxyacyl derivatives. In the latter cases, the sodium bicarbonate wash is omitted. Then, following the procedure of Example 4, each of those 15,19-diacyloxy dienoic and trienoic acids is separately reacted with diazomethane or with each of the other above-mentioned diazohydrocarbons to produce the same esterified dicarboxyacyl derivatives produced by the alternative route, i.e., first esterification and then carboxyacylation.

EXAMPLE 9.—SODIUM 15,19-DIHYDROXY-9-OXOPROSTA-10,TRANS-13-DIENOATE

Essentially pure 15,19-dihydroxy-9-oxoprosta-10,trans-13-dienoic acid (2 mg.) is dissolved in 3 ml. of water-ethanol 1:1. The solution is cooled to about 10° C. and is neutralized with an equivalent amount of 0.1 N aqueous sodium hydroxide solution. Evaporation to dryness gives essentially pure sodium 15,19-dihydroxy-9-oxoprosta-10,trans-13-dienoate.

Following the procedure of Example 15 but using in place of the essentially pure 15,19-dihydroxy-9-oxoprosta-10,trans-13-dienoic acid, essentially pure 15,19-dihydroxy-9-oxoprosta-cis-5,10,trans - 13 - trienoic acid; essentially pure 15,19 - dihydroxy - 9 - oxoprosta-8(12),trans-13-dienoic acid; essentially pure 15,19-dihydroxy-9-oxoprosta-cis-5,8(12),trans-13-trienoic acid; 15,19-dihydroxy-9-oxoprostanoic acid; and 15,19-diacetoxy-9-oxoprostanoic acid, there are obtained the corresponding sodium salts.

Also following the procedure of Example 15 but using potassium hydroxide, calcium hydroxide, tetramethylammonium hydroxide, and benzyltrimethylammonium hydroxide, there are obtained the corresponding salts of essentially pure 15,19-dihydroxy-9-oxoprosta-10,trans-13-dienoic acid.

What is claimed is:

1. A compound of the formula:

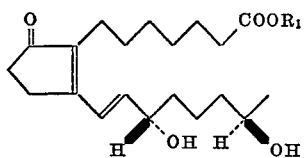

wherein $R_1$ is hydrogen or a pharmacologically acceptable cation, essentially free of proteins, enzymes, cellular material, and other organic acids or salts thereof.

2. A compound according to claim 1 wherein $R_1$ is hydrogen.

3. A compound according to claim 1 wherein $R_1$ is a pharmacologically acceptable cation.

References Cited

Hamberg et al., Biochim. Biophys. Acta, 106, 215 (1965).

LORRAINE A. WEINBERGER, Primary Examiner

R. GERSTL, Assistant Examiner

U.S. Cl. X.R.

260—211 R, 247.2 R, 268 R, 293.65, 326.3, 429.9, 439 R, 448 R, 468 D, 501.1, 501.15, 501.17, 501.2; 424—317